(12) United States Patent
Nakanishi

(10) Patent No.: US 10,549,461 B2
(45) Date of Patent: Feb. 4, 2020

(54) COMPOSITE MATERIAL AND METHOD OF PRODUCING THE SAME

(71) Applicant: TOYOTA JIDOSHA KABUSHIKI KAISHA, Toyota-shi, Aichi-ken (JP)

(72) Inventor: Koji Nakanishi, Konan (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/853,176

(22) Filed: Dec. 22, 2017

(65) Prior Publication Data

US 2018/0178421 A1    Jun. 28, 2018

(30) Foreign Application Priority Data

Dec. 28, 2016 (JP) ................... 2016-256717

(51) Int. Cl.
| | |
|---|---|
| *B29C 44/34* | (2006.01) |
| *B29C 44/02* | (2006.01) |
| *C08J 9/00* | (2006.01) |
| *C08J 9/228* | (2006.01) |
| *B29K 105/04* | (2006.01) |

(52) U.S. Cl.
CPC .......... *B29C 44/3415* (2013.01); *B29C 44/02* (2013.01); *C08J 9/0066* (2013.01); *C08J 9/228* (2013.01); *B29K 2105/041* (2013.01); *C08J 2203/12* (2013.01); *C08J 2205/04* (2013.01); *C08J 2367/00* (2013.01)

(58) Field of Classification Search
None
See application file for complete search history.

(56) References Cited

U.S. PATENT DOCUMENTS

| | | | | |
|---|---|---|---|---|
| 4,889,875 A | * | 12/1989 | Aust | ...................... C08J 9/0066 521/123 |
| 6,323,251 B1 | * | 11/2001 | Perez | ....................... B41M 1/04 428/343 |
| 2004/0029985 A1 | | 2/2004 | Aki et al. | |
| 2004/0241417 A1 | * | 12/2004 | Fischer | ..................... B32B 5/18 428/317.9 |
| 2009/0311507 A1 | | 12/2009 | Bauer et al. | |
| 2014/0039076 A1 | | 2/2014 | Katayama et al. | |
| 2015/0018473 A1 | | 1/2015 | Shimizu | |
| 2015/0056892 A1 | | 2/2015 | Vacassy et al. | |
| 2015/0359134 A1 | * | 12/2015 | Soong | .................. H05K 7/2039 361/720 |

FOREIGN PATENT DOCUMENTS

| | | |
|---|---|---|
| CN | 104231461 A | 12/2014 |
| JP | 63265934 A | 11/1988 |

(Continued)

OTHER PUBLICATIONS

Hirao, Akira et al., Inorganic Particle-Containing Foam, Jan. 24, 2013, machine translation of JP2013-014716A (Year: 2013).*

*Primary Examiner* — Chinessa T. Golden
(74) *Attorney, Agent, or Firm* — Sughrue Mion, PLLC

(57) ABSTRACT

There is provided a composite material including scaly fillers made of an inorganic material and a binding resin that is a thermosetting resin which binds the fillers. The composite material 1 is a foaming material in which a plurality of voids is dispersed therein, and the fillers accumulate on inner walls of the voids so that flat surfaces of the fillers overlap.

12 Claims, 10 Drawing Sheets

(56) References Cited

FOREIGN PATENT DOCUMENTS

| | | | |
|---|---|---|---|
| JP | 10-072534 | A | 3/1998 |
| JP | 2002-317064 | A | 10/2002 |
| JP | 2005162970 | A | 6/2005 |
| JP | 2007-154041 | A | 6/2007 |
| JP | 2008-514750 | A | 5/2008 |
| JP | 2009-191171 | A | 8/2009 |
| JP | 2013014716 | A * | 1/2013 |
| JP | 2013014716 | A | 1/2013 |
| JP | 2015-105282 | A | 6/2015 |
| JP | 6143107 | B2 | 6/2017 |
| RU | 2263124 | C2 | 10/2005 |
| RU | 2431642 | C2 | 10/2011 |
| WO | 2006/135397 | A2 | 12/2006 |
| WO | 2013/042611 | A1 | 3/2013 |

* cited by examiner

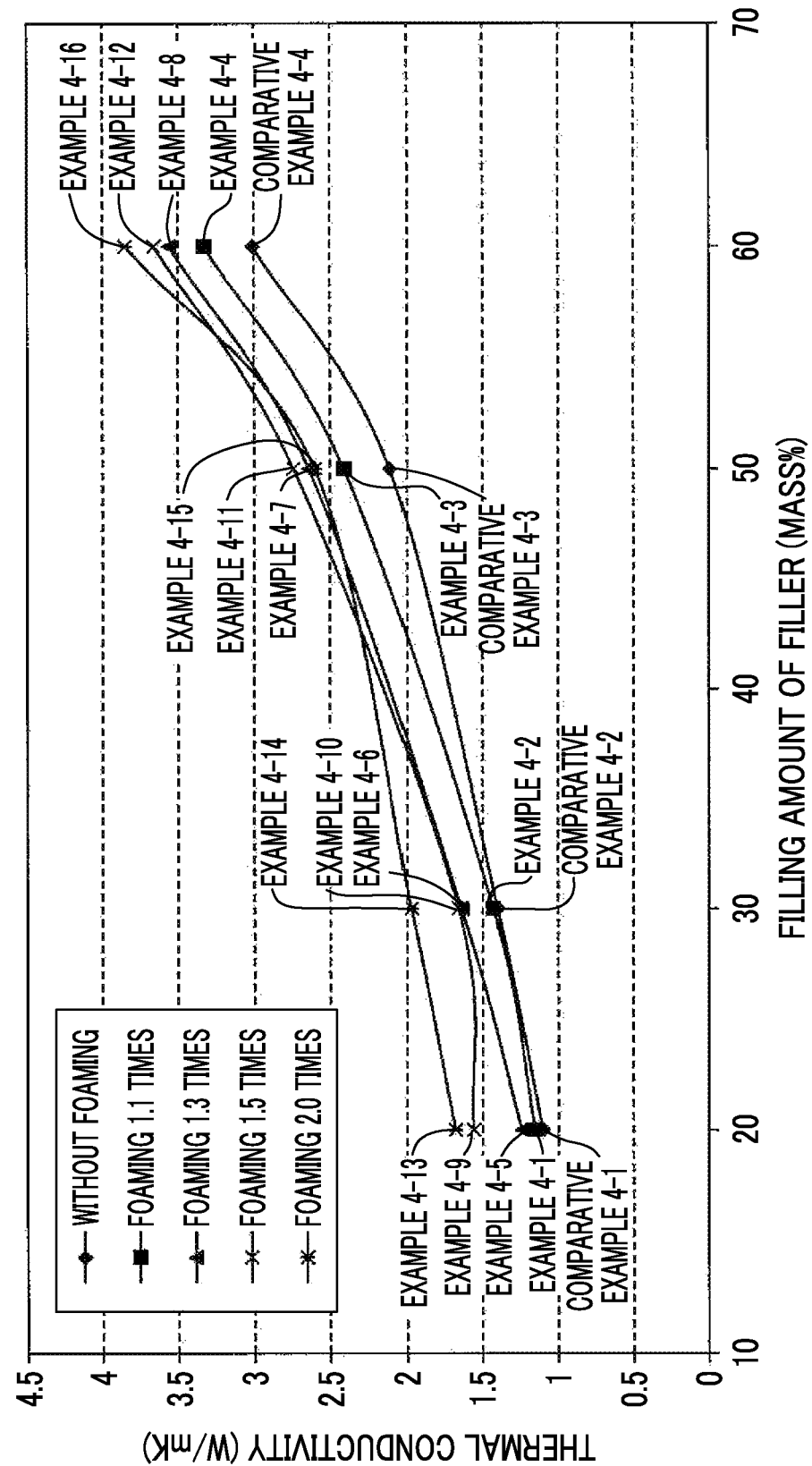

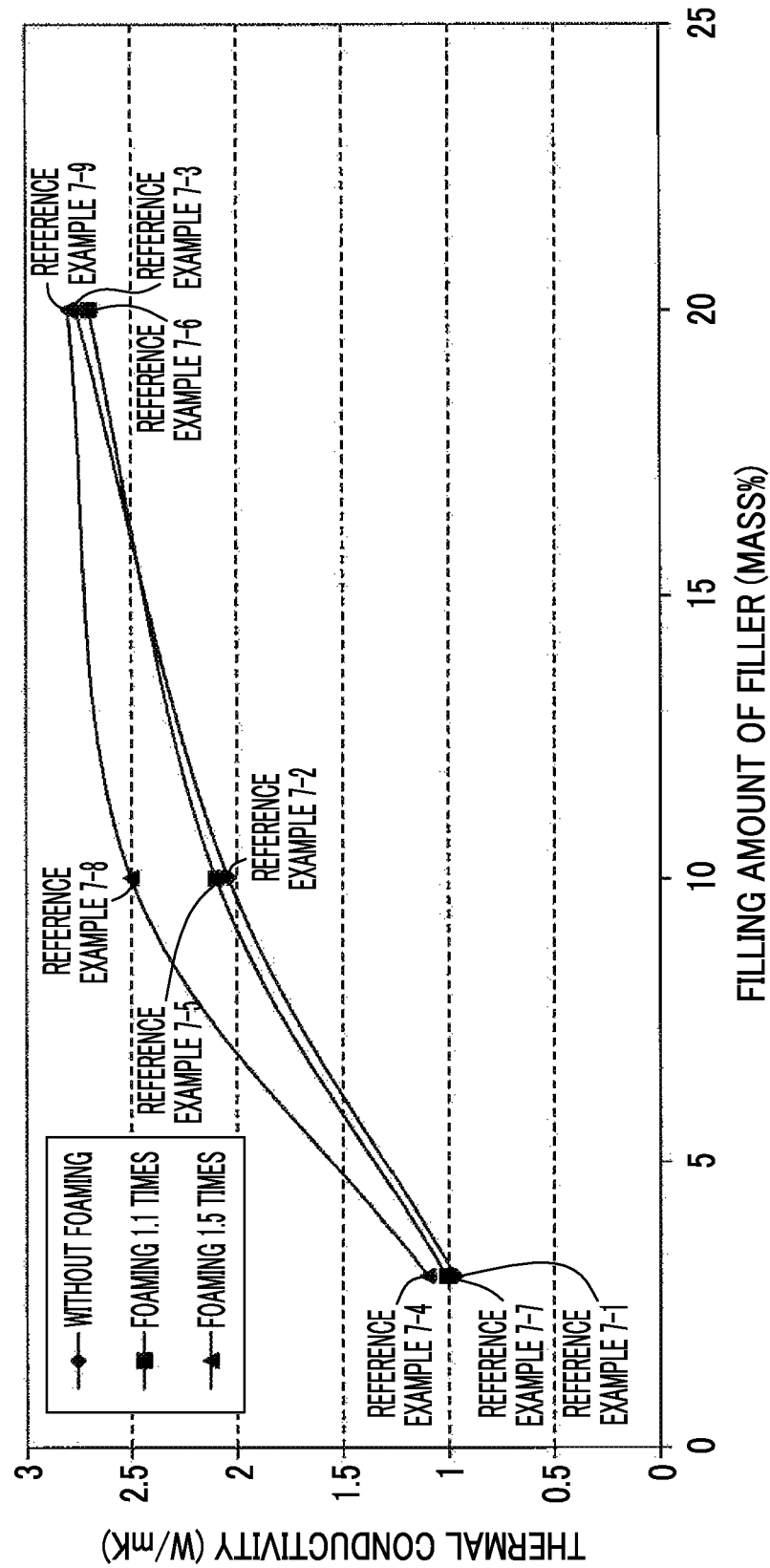

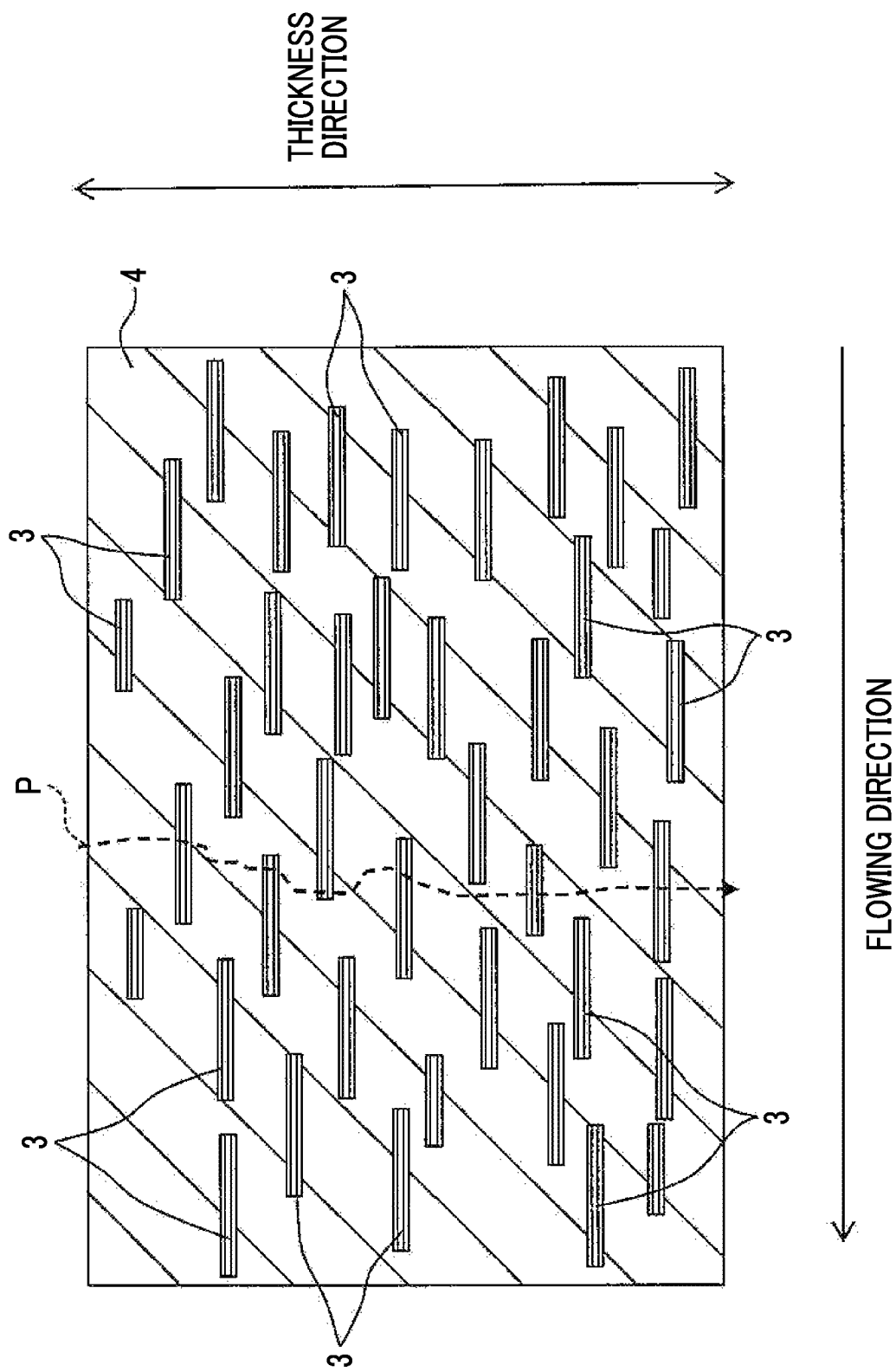

COMPOSITE MATERIAL AND METHOD OF PRODUCING THE SAME

INCORPORATION BY REFERENCE

The disclosure of Japanese Patent Application No. 2016-256717 filed on Dec. 28, 2016 including the specification, drawings and abstract is incorporated herein by reference in its entirety.

BACKGROUND

1. Technical Field

The present disclosure relates to a composite material including a filler made of an inorganic material and a binding resin which binds the filler and a method of producing the same.

2. Description of Related Art

For example, as techniques of this type, composite materials in which filler made of an inorganic material is bonded by a binding resin are disclosed in Japanese Unexamined Patent Application Publication No. 2015-105282 (JP 2015-105282 A) and Japanese Unexamined Patent Application Publication No. 2002-317064 (JP 2002-317064 A). JP 2015-105282 A discloses a composite material including a base material (binding resin) made of an elastomer and composite particles (filler) contained in the base material in an oriented state. The filler includes thermally conductive anisotropic particles having anisotropy in thermal conduction and magnetic particles adhered to the surface of the thermally conductive anisotropic particles by a binder. When the composite material is molded, a magnetic field is applied in a certain direction. Therefore, the fillers are oriented in a certain direction in the composite material.

P 2002-317064 A discloses a composite material which is interposed between two members and in which heat of one member is transferred to the other member. The composite material having foamability includes a foaming agent foamable at 40° C. or higher and a resin composition (binding resin) including highly thermally conductive fillers. This composite material is foamed due to heat of one member during use. The binding resin of the composite material is made of a cured thermosetting resin. As the thermosetting resin, a soft resin in which a composite material can freely expand during foaming is selected.

SUMMARY

However, in the composite material in JP 2015-105282 A, since fillers are arranged in a certain direction due to a magnetic field during molding, the thermal conductivity of the composite material in this direction is favorable. However, in a direction crossing this direction, since fillers are separated from each other and bonded by a binding resin, it is hard to say that the thermal conductivity is sufficient, and more fillers need to be added (filled in) in order to increase the thermal conductivity. When an amount of the fillers increases, there is a risk of the fluidity inherent in the binding resin being lowered during molding.

On the other hand, in the composite material in JP 2002-317064 A, since the binding resin (thermosetting resin) is cured while fillers are arranged in a flowing direction of the binding resin during molding, the fillers are constrained by the binding resin. Therefore, for example, even if the composite material is foamed during use, the direction in which fillers are arranged hardly changes, and the thermal conductivity of the composite material in a direction crossing the flowing direction of the binding resin is not sufficient.

The present disclosure provides a composite material and a method of producing the same through which it is possible to increase thermal conductivity in a direction crossing a flowing direction of a binding resin during molding.

A first aspect of the present disclosure relates to a composite material including scaly fillers made of an inorganic material and a binding resin that is a thermosetting resin which binds the fillers. The composite material is a foaming material formed such that a plurality of voids are dispersed therein, and the fillers accumulate on inner walls of the voids so that flat surfaces of the fillers overlap each other.

According to the present disclosure, the fillers accumulate on inner walls of the voids in the composite material so that flat surfaces of the scaly fillers overlap each other. Therefore, a thermal conductivity path can be formed due to a skeleton of the scaly fillers accumulated in an overlapping manner also in a direction crossing the flowing direction of the binding resin. Therefore, even if the space of the voids which decreases thermal conductivity of the composite material is formed, due to the skeleton of the fillers accumulated in an overlapping manner, an effect of improving thermal conductivity in a direction crossing the flowing direction of the binding resin to compensate for a decrease in thermal conductivity due to the voids can be expected.

In addition, a second aspect of the present disclosure relates to a method of producing a composite material that includes scaly fillers made of an inorganic material and a binding resin that is a thermosetting resin which binds the fillers. This production method includes a process of preparing a mixture by mixing the fillers, the binding resin that is an uncured thermosetting resin, and a foaming agent that causes the binding resin to foam at a temperature lower than a curing temperature of the thermosetting resin; and a process of heating the mixture to the curing temperature or higher such that i) the binding resin is foamed with the foaming agent so that the fillers accumulate on inner walls of voids in the binding resin formed by the foaming agent and flat surfaces of the fillers overlap each other, and ii) then the binding resin is cured.

According to the present disclosure, in the process of preparing the mixture or in the process of putting the mixture into a mold or the like before the binding resin is cured, with respect to the flowing direction of the binding resin, the fillers are likely to be arranged in a predetermined direction. However, in the process of curing the binding resin, before the binding resin is cured, the mixture is foamed by the foaming agent, and voids (bubbles) grow so that the fillers are pushed away. In this case, since the fillers are scaly, fillers accumulate on the inner wall of the voids in the binding resin so that flat surfaces of the fillers overlap each other, and the binding resin can be cured in that state. As a result, it is possible to increase thermal conductivity of the composite material in a direction crossing the flowing direction of the binding resin.

According to the present disclosure, it is possible to increase thermal conductivity in a direction crossing the flowing direction of the binding resin during molding.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a graph showing measurement results of thermal conductivities of composite materials of Examples 4-1 to 4-16 and Comparative Examples 4-1 to 4-4 in the thickness direction;

FIG. 7 is a graph showing measurement results of thermal conductivities of composite materials of Reference Examples 7-1 to 7-9 in the thickness direction; and FIG. 8 is a schematic sectional view of a composite material in a non-foamed state in a composite material using scaly fillers.

DETAILED DESCRIPTION OF EMBODIMENTS

A composite material and a method of producing the same according to embodiments of the present disclosure will be described below.

1. Composite Material 1

Figure 1:
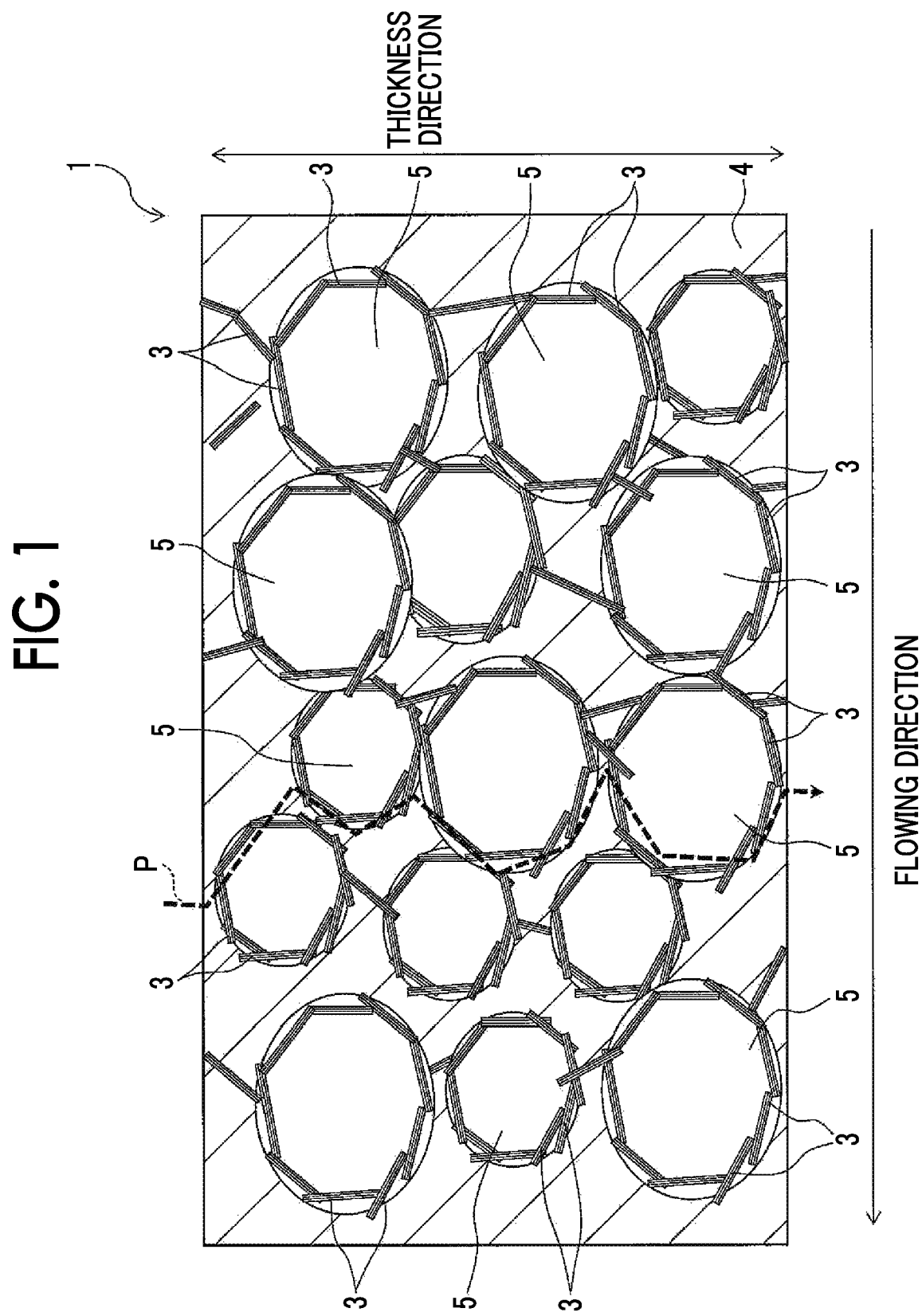
FIG. 1 is a schematic sectional view of a composite material according to an embodiment of the present disclosure.

As shown in FIG. 1, a composite material 1 according to the present embodiment includes scaly fillers (filler particles) 3 made of an inorganic material and a binding resin 4 that is a thermosetting resin which binds the scaly fillers 3.

Figure 3A:
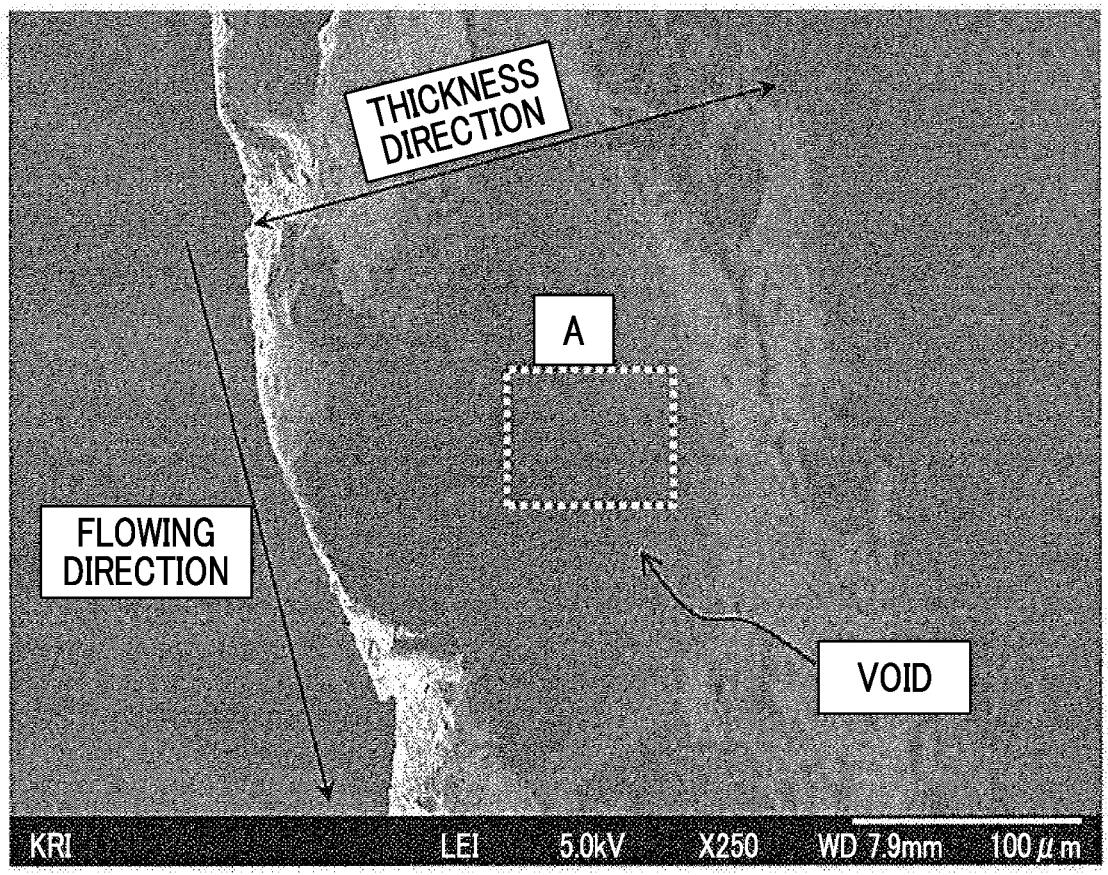
FIG. 3A is a picture obtained by imaging an appearance of voids formed in a composite material.
Figure 3B:
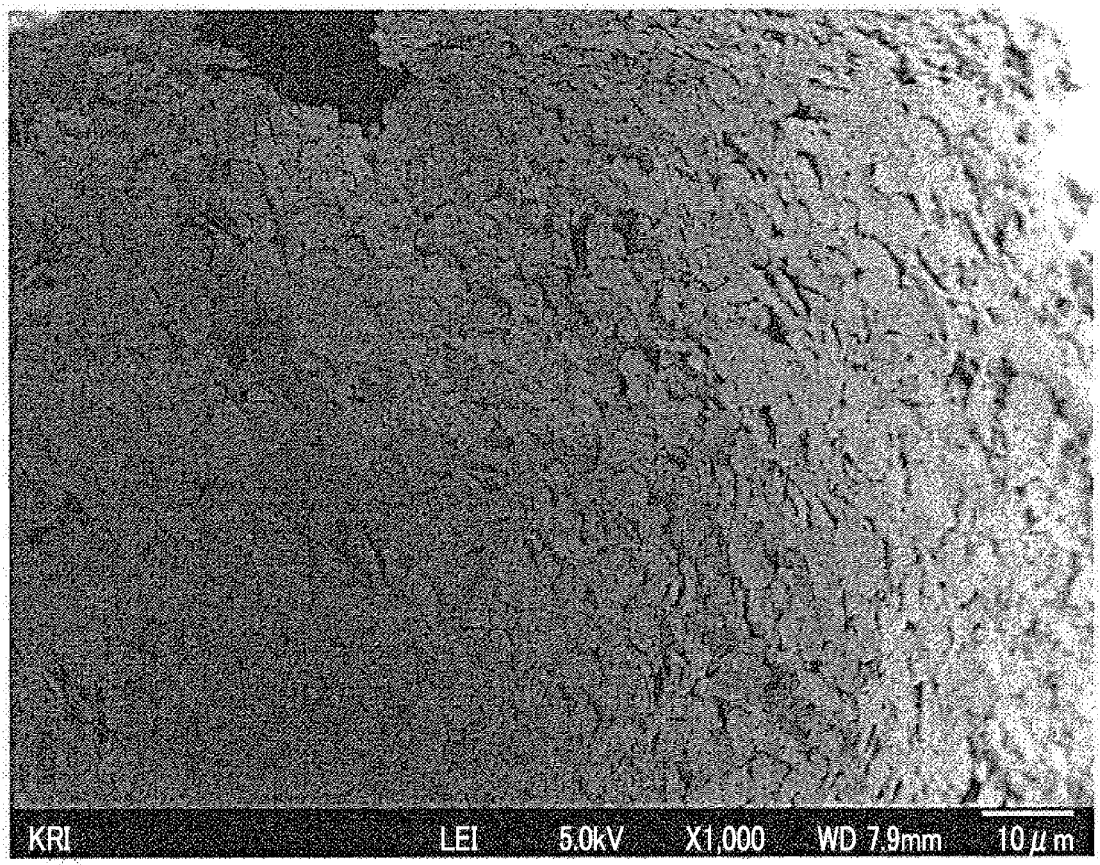
FIG. 3B is an enlarged picture of an inner wall of voids of a part A in FIG. 3A.
Figure 3C:
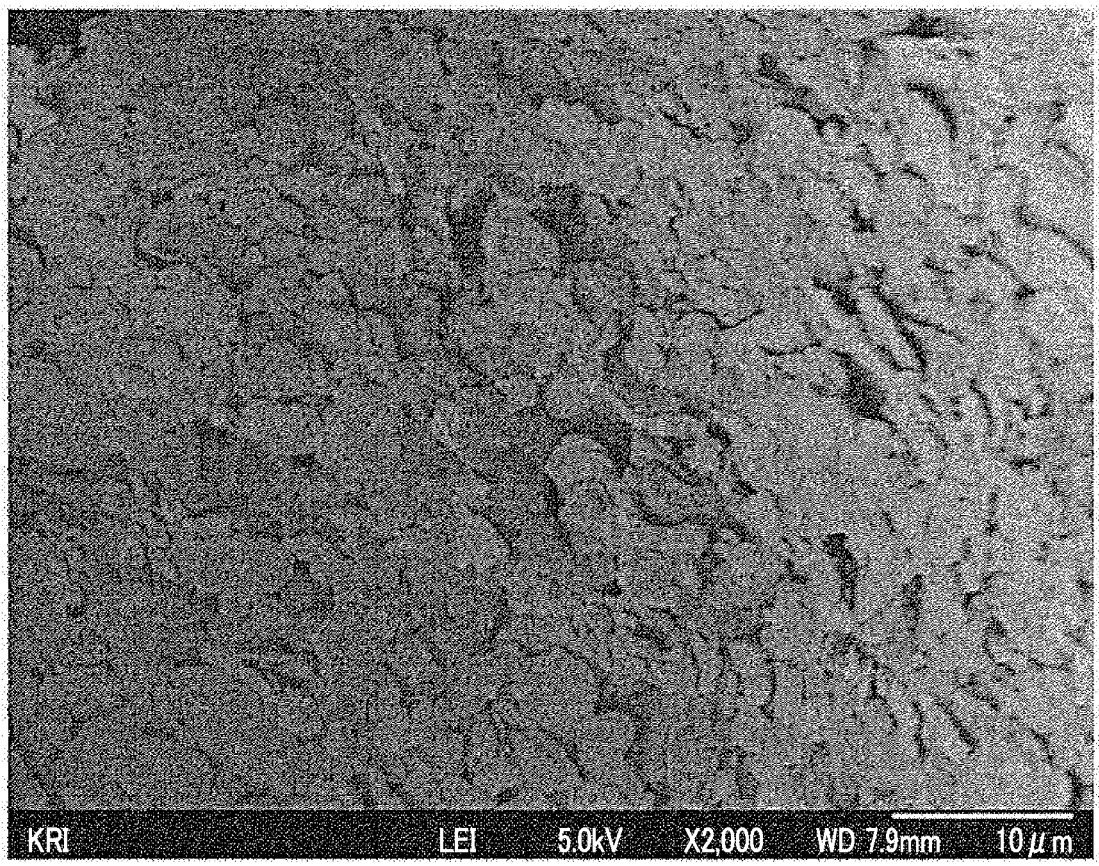
FIG. 3C is an enlarged picture of the picture in FIG. 3B.

In the present embodiment, as shown in FIG. 1 and FIG. 3B and FIG. 3C to be described below, the composite material 1 is a foaming material in which a plurality of voids 5 are dispersed therein. The fillers 3 accumulate on the inner wall of the voids 5 so that flat surfaces of the scaly fillers 3 overlap each other. Specifically, the voids 5 are substantially spherical and the scaly fillers 3 accumulate on the inner wall surface thereof in an overlapping manner. Therefore, a skeleton of the inorganic material is formed, and the fillers 3 are dispersed in a part other than the voids 5 so that they come in contact with the skeleton.

The filler 3 is made of an inorganic material, and is, specifically, a material having a higher thermal conductivity than that of a thermosetting resin which is the binding resin 4. As the material of the filler 3, a material having a thermal conductivity of 1.0 W/m·K or more is more preferable, and a material having a thermal conductivity of 3.0 W/m·K or more is further more preferable. The material of the filler 3 is not particularly limited as long as it is a scaly filler. For example, kaolinite, talc, micas such as sericite, muscovite, and phlogopite, mica, silica, graphite, a metal such as aluminum, and hexagonal boron nitride may be exemplified. In order to obtain a composite material having an insulation property and a nonmagnetic property, a filler made of hexagonal boron nitride, mica, or silica is more preferable.

The thickness of the filler 3 is preferably in a range of 0.1 μm to 1.0 μm. The average length of flat surfaces of the fillers 3 is preferably in a range of 5.0 μm to 50.0 m. In addition, the ratio of the average length of flat surfaces of the fillers 3 with respect to the thickness of the filler 3 is preferably in a range of 50 to 500. Here, the average length of the fillers 3 is an average value of lengths of the fillers 3 when 1000 fillers are observed under a microscope in a direction orthogonal to the flat surface of the filler in a plan view. The thickness of the filler 3 is an average value of the thicknesses at the center of the fillers at this average length.

When the ratio of the fillers 3 is within this range, fillers more easily accumulate on the inner wall of the voids 5 so that flat surfaces of the fillers 3 overlap each other during production. Here, when the proportion of the fillers 3 described above is less than 50, flat surfaces of the fillers 3 hardly overlap each other. When the proportion thereof exceeds 500, the fillers 3 hardly accumulate.

The content of the fillers 3 is preferably 10 mass % to 30 mass % and more preferably 20 mass % to 60 mass % with respect to the entire composite material 1. When the fillers 3 are contained in such a range, it is possible to ensure thermal conductivity of the composite material 1 more suitably and it is possible to ensure the strength of the composite material 1 more suitably.

In the present embodiment, the binding resin 4 constituting the composite material 1 is a thermosetting resin, and is, for example, a resin having a curing temperature higher than a temperature at which a foaming agent to be described below foams. For example, as the thermosetting resin, for example, a phenolic resin, a urea resin, a melamine resin, a diallyl phthalate resin, a polyester resin, an epoxy resin, an aniline resin, a silicone resin, a furan resin, a polyurethane resin, an alkylbenzene resin, a guanamine resin, a xylene resin, and an imide resin may be exemplified.

In the present embodiment, the composite material 1 is a material in which a plurality of voids 5 foam. The voids 5 may be independent bubbles or continuous bubbles. However, more preferably, the voids 5 are independent bubbles. When the voids 5 are independent bubbles, it is possible to form the voids 5 in the composite material 1 more uniformly than when the voids 5 are continuous bubbles. According to the fillers 3 accumulated on the inner wall of the voids 5 in an overlapping manner, a thermal conduction path P of the composite material 1 is easily formed independently of the direction, and the composite material 1 exhibits isotropy in thermal conductivity.

When the voids 5 are independent bubbles, the voids 5 are substantially spherical, and the diameter thereof is preferably 1 μm or more and 500 μm or less. The diameter of the voids 5 is more preferably 200 μm or less and further more preferably 100 μm or less. Thus, when the fillers 3 accumulate while an influence of thermal resistance due to the voids 5 is suppressed, it is possible to further enhance an effect of increasing thermal conductivity of the composite material 1. Here, the diameter of the voids 5 is an average value of maximum diameters of 20 voids when a cross section of the composite material 1 is cut and the cross section is observed.

Here, as long as it is possible to ensure the thermal conductivity to be described below, an occupancy proportion of the voids 5 occupying the composite material 1 with respect to the entire composite material 1 is not particularly limited. However, the occupancy proportion is preferably 9 volume % or more and 50 volume % or less with respect to the entire composite material 1. Thus, it is possible to ensure an amount of the fillers 3 accumulated on the inner wall of the voids 5 in an overlapping manner, and it is possible to easily increase thermal conductivity in a direction crossing the flowing direction of the binding resin 4 during molding. The occupancy proportion of the voids 5 is more preferably 23 volume % or more, further more preferably 33 volume % or more, and particularly preferably 50 volume % or more with respect to the entire composite material 1. In such a range, as can be clearly understood from examples to be described below, it is possible to further increase thermal conductivity of the composite material 1 in the direction (a thickness direction to be described below) crossing the flowing direction of the binding resin 4.

According to the composite material 1 according to the present embodiment, the fillers 3 accumulate on the inner wall of the voids 5 of the composite material 1 so that flat surfaces of the scaly fillers 3 overlap each other. Thus, also in a direction crossing the flowing direction of the binding resin 4 during production, it is possible to form the thermal conduction path P due to the scaly fillers 3 accumulated in an overlapping manner. Therefore, even if the space of the voids 5 which decreases thermal conductivity of the composite material 1 is formed, due to the skeleton of the scaly fillers 3 accumulated in an overlapping manner, an effect of improving thermal conductivity in a direction crossing the flowing direction of the binding resin 4 to compensate for a decrease in thermal conductivity due to the voids 5 can be expected.

2. Method of Producing Composite Material 1

A method of producing the composite material 1 according to the present embodiment will be described below. First, the scaly filler 3 described above, the binding resin 4 made of an uncured thermosetting resin, and a foaming agent causing the binding resin to foam at a temperature lower than a curing temperature of the thermosetting resin are mixed to prepare a mixture. Here, the mixed mixture may be subjected to a defoaming treatment as necessary.

Here, as the filler 3, a filler having the size described above is preferably used. In particular, when fillers with the proportion of the average length of the flat surface of the filler 3 in a range of 50 to 500 with respect to the thickness of the filler 3 are used, the fillers 3 easily accumulate on the inner wall of the voids 5 in the binding resin 4 so that flat surfaces of the fillers 3 overlap each other during foaming to be described below.

A thermally decomposable foaming agent or an evaporating foaming agent may be used as long as the binding resin can be foamed at a temperature lower than a curing temperature of the thermosetting resin. As the thermally decomposable foaming agent, an inorganic foaming agent such as sodium bicarbonate, ammonium carbonate, ammonium bicarbonate, and an azide compound, an azo compound such as azodicarbonamide, azobisformamide, azobisisobutyronitrile, and diazoaminobenzene, a nitroso compound, and a sulfonyl hydrazide compound can be exemplified. As the evaporating foaming agent, ethanol and water may be exemplified.

Here, an amount of the foaming agent added is not particularly limited as long as it is possible to foam a mixture (binding resin) with the foaming agent. However, as described above, the foaming agent is preferably mixed with the filler 3 and the binding resin 4 so that the occupancy proportion of the voids 5 occupying the composite material 1 is 9 volume % or more. In addition, preferably, the foaming agent is mixed in so that the occupancy proportion of the voids 5 is 23 volume % or more. More preferably, the foaming agent is mixed in so that the occupancy proportion of the voids 5 is 33 volume % or more. Particularly preferably, the foaming agent is mixed in so that the occupancy proportion of the voids 5 is 50 volume % or more. In such a range, as can be clearly understood from examples to be described below, it is possible to further increase thermal conductivity of the composite material 1 in a direction crossing the flowing direction of the binding resin 4.

Next, when the mixture is heated at a curing temperature or higher, the foaming agent causes the binding resin 4 to foam, and the fillers 3 accumulate on the inner wall of the voids 5 in the binding resin 4 formed by the foaming agent so that flat surfaces of the fillers 3 overlap each other, and the binding resin 4 is then cured. In this case, after the obtained mixture is introduced into a mold, the binding resin 4 may be cured by heating the mixture in the mold.

In the operations described above, in the process of preparing the mixture or in the process of putting the mixture into a mold or the like before the binding resin 4 is cured, with respect to the flowing direction of the binding resin 4, the fillers 3 are likely to be arranged in a predetermined direction (refer to FIG. 8). In such a state, it is difficult to form the thermal conduction path P in a direction (the thickness direction shown in FIG. 8) crossing the flowing direction of the binding resin 4.

However, in the present embodiment, in the process of curing the binding resin 4, before the binding resin 4 is cured, the mixture is foamed by the foaming agent, and voids (bubbles) grow so that the fillers 3 are pushed away. In this case, since the fillers 3 are scaly, fillers accumulate on the inner wall of the voids 5 in the binding resin 4 so that flat surfaces of the filler 3 overlap each other, and the binding resin can be cured in that state. As a result, it is possible to increase thermal conductivity of the composite material 1 in a direction crossing the flowing direction of the binding resin 4 during molding.

Here, depending on a heating time of the mixture in a temperature range of a temperature at which the foaming agent is foamed or higher and less than a temperature at which the thermosetting resin is cured, a type of the foaming agent selected, and an amount of the foaming agent added to the mixture, it is possible to adjust the size, the shape, and the like of the voids 5. When a heating time in the temperature range described above is long (a rate of temperature increase is fast), the growth of voids due to the foaming agent is reduced, and independent bubbles are easily formed. In addition, when a heating time (a rate of temperature increase) in the temperature range is adjusted, it is possible to adjust the diameter of the voids.

When such adjustment is performed, in the present embodiment, as a preferable aspect, the binding resin 4 is cured so that the voids 5 becomes independent bubbles and the diameter of the voids 5 becomes 50 μm or less. The diameter of the voids 5 is more preferably 200 μm or less and further more preferably 100 μm or less. Thus, when the fillers 3 accumulate while an influence of thermal resistance due to the voids 5 is suppressed, it is possible to further enhance an effect of increasing thermal conductivity of the composite material 1.

The present disclosure will be described below with reference to examples.

Example 1-1

As scaly fillers made of an inorganic material, fillers (HGP commercially available from Denka Company Limited) made of hexagonal boron nitride (h-BN) were provided. The fillers had a thickness of 0.1 μm and an average length of flat surfaces of 5 μm. The proportion of the average length of flat surfaces with respect to the thickness of the filler was 50.

Next, as a binding resin (thermosetting resin) which binds fillers while the fillers were dispersed, an uncured polyester resin (WP2008 commercially available from Hitachi Chemical Co., Ltd.) was provided. The curing temperature of the polyester resin was 130° C. As a foaming agent causing the polyester resin to foam at a temperature lower than the curing temperature, ethanol (boiling point 78° C.) was provided.

Next, the fillers, the binding resin, and ethanol were mixed in proportions of 60 parts by weight, 40 parts by weight, and 1 parts by weight, respectively, to prepare a slurry-like mixture. Here, the proportion of ethanol was a proportion at which a mixture (without ethanol) in which the fillers and the binding resin were combined could be foamed to 2.0 times its original volume.

Next, the mixture was put into a bottomed cylindrical mold with a diameter of 50 mm and a height of 7 mm. Next, when the mixture in the mold was heated at 150° C. (that is, a curing temperature or higher) for 1 hour, the polyester resin was foamed using ethanol, and the foamed polyester resin was cured to prepare a specimen made of a composite material. The prepared specimen was made of a composite material of 60 mass % scaly hexagonal boron nitride fillers (ratio of 50) which were bonded together using the polyester resin with respect to the entire composite material and which had a foaming magnification of 2.0.

In Example 1, when the polyester resin was cured, a rate of temperature increase at which the temperature was raised to 150° C. was set to 5° C./min, voids were present in the composite material as independent bubbles, and the diameter of the voids was 200 μm when observed under a scanning electron microscope (SEM) to be described below. Here, the thickness direction of the specimen (composite material) corresponds to the height direction of the mold during molding, and the thickness direction of the specimen (composite material) corresponds to the direction orthogonal to the flowing direction of the resin when put into the mold.

Example 1-2

A specimen made of a composite material was prepared in the same manner as in Example 1-1. Example 1-2 was different from Example 1-1 in that fillers (PT-120 commercially available from Momentive Performance Materials Inc.) having a thickness of 0.1 μm and having an average length of flat surfaces of 120 μm were used as scaly hexagonal boron nitride fillers. The proportion of the average length of flat surfaces of the fillers with respect to the thickness of the fillers was 120. The prepared specimen was made of a composite material of 60 mass % of scaly hexagonal boron nitride fillers (ratio of 120) which were bonded together using the polyester resin with respect to the entire composite material and which had a foaming magnification of 2.0.

Example 1-3

A specimen made of a composite material was prepared in the same manner as in Example 1-1. Example 1-3 was different from Example 1-1 in that fillers (PT-110 commercially available from Momentive Performance Materials Inc.) having a thickness of 0.1 μm and an average length of flat surfaces of 45 μm were used as scaly hexagonal boron nitride fillers. The proportion of the average length of flat surfaces of the fillers with respect to the thickness of the fillers was 450. The prepared specimen was made of a composite material of 60 mass % of scaly hexagonal boron nitride fillers (ratio of 450) which were bonded using the polyester resin with respect to the entire composite material and which had a foaming magnification of 2.0.

Comparative Example 1

A specimen made of a composite material was prepared in the same manner as in Example 1-1. Comparative Example 1 was different from Example 1-1 in that no ethanol serving as a foaming agent was added. The prepared specimen was made of a non-foamed composite material (foaming magnification of 0.0) of 60 mass % of scaly hexagonal boron nitride fillers (ratio of 50) which were bonded using the polyester resin with respect to the entire composite material.

Comparative Example 2-1

A non-foamed specimen (foaming magnification of 0.0) including only the binding resin (polyester resin) used in Example 1-1 was prepared in the same procedures as in Example 1-1.

Comparative Example 2-2

A specimen made of a composite material was prepared in the same manner as in Example 1-1. Comparative Example 2-2 was different from Example 1-1 in that no ethanol serving as a foaming agent was added, and spherical alumina fillers (AO-509 commercially available from Admatechs) with an average particle size of 10 μm were used in place of scaly fillers. The prepared specimen was made of a non-foamed composite material (foaming magnification of 0.0) in which spherical alumina fillers of 60 mass % with respect to the entire composite material were bonded through the polyester resin.

Comparative Example 2-3

A specimen made of a composite material was prepared in the same manner as in Example 1-1. Comparative Example 2-3 was different from Example 1-1 in that the same fillers as in Comparative Example 2-2 were used in place of scaly fillers. The prepared specimen was made of a composite material of 60 mass % of spherical alumina fillers which were bonded together using the polyester resin with respect to the entire composite material and which had a foaming magnification of 2.0.

Comparative Example 3-1

A non-foamed specimen (foaming magnification of 0.0) including only a silicone resin (KE-1871 commercially available from Shin-Etsu Chemical Co., Ltd.) which is a thermosetting resin was prepared in the same procedures as in Example 1-1. Here, in Comparative Example 3-1, the uncured silicone resin was heated at 120° C. (that is, a curing temperature or higher) for 1 hour and cured. The curing temperature of the silicone resin was 100° C.

Comparative Example 3-2

A specimen made of a composite material was prepared in the same manner as in Example 1-1. Comparative Example 3-2 was different from Example 1-1 in that no ethanol serving as a foaming agent was added, pulverized (amorphous) diamond fillers (MB300UM commercially available from Deldent Ltd.) with a particle size in a range of 10 μm to 20 μm were used in place of scaly fillers, and the same silicone resin as in Comparative Example 3-1 was used as a binding resin.

Moreover, Comparative Example 3-2 was different from Example 1-1 in that a mixture in which diamond fillers and the silicone resin were mixed in proportions of 84 parts by weight and 16 parts by weight, respectively, was heated under the same conditions as in Comparative Example 3-1. The prepared specimen was made of a composite material of 84 mass % of pulverized diamond fillers which were bonded using the non-foamed silicone resin with respect to the entire composite material and which had a foaming magnification of 0.0.

Comparative Example 3-3

A specimen made of a composite material was prepared in the same manner as in Example 1-1. Comparative Example 3-3 was different from Example 1-1 in that the same pulverized diamond fillers as in Comparative Example 3-2 were used in place of scaly fillers, and the same silicone resin as in Comparative Example 3-1 was used as a binding resin.

Moreover, Comparative Example 3-3 was different from Example 1-1 in that a mixture in which the diamond fillers, the silicone resin, and ethanol were mixed in proportions of 84 parts by weight, 16 parts by weight, and 2 parts by weight, respectively, was heated under the same conditions as in Comparative Example 3-1. Here, the proportion of the ethanol was a proportion at which a mixture without ethanol could be foamed to 2.0 times its original volume. The prepared specimen was made of a composite material of 84 mass % of the pulverized diamond fillers which were bonded using the silicone resin with respect to the entire composite material and which had a foaming magnification of 2.0.

Here, since the foaming magnification of the composite materials of Examples 1-1 to 1-3, Comparative Example 2-3, and Comparative Example 3-3 was 2.0, the occupancy proportion of the voids occupying the composite material with respect to the entire composite material was 50 volume %.

<Measurement of Thermal Conductivity>

Figure 2:
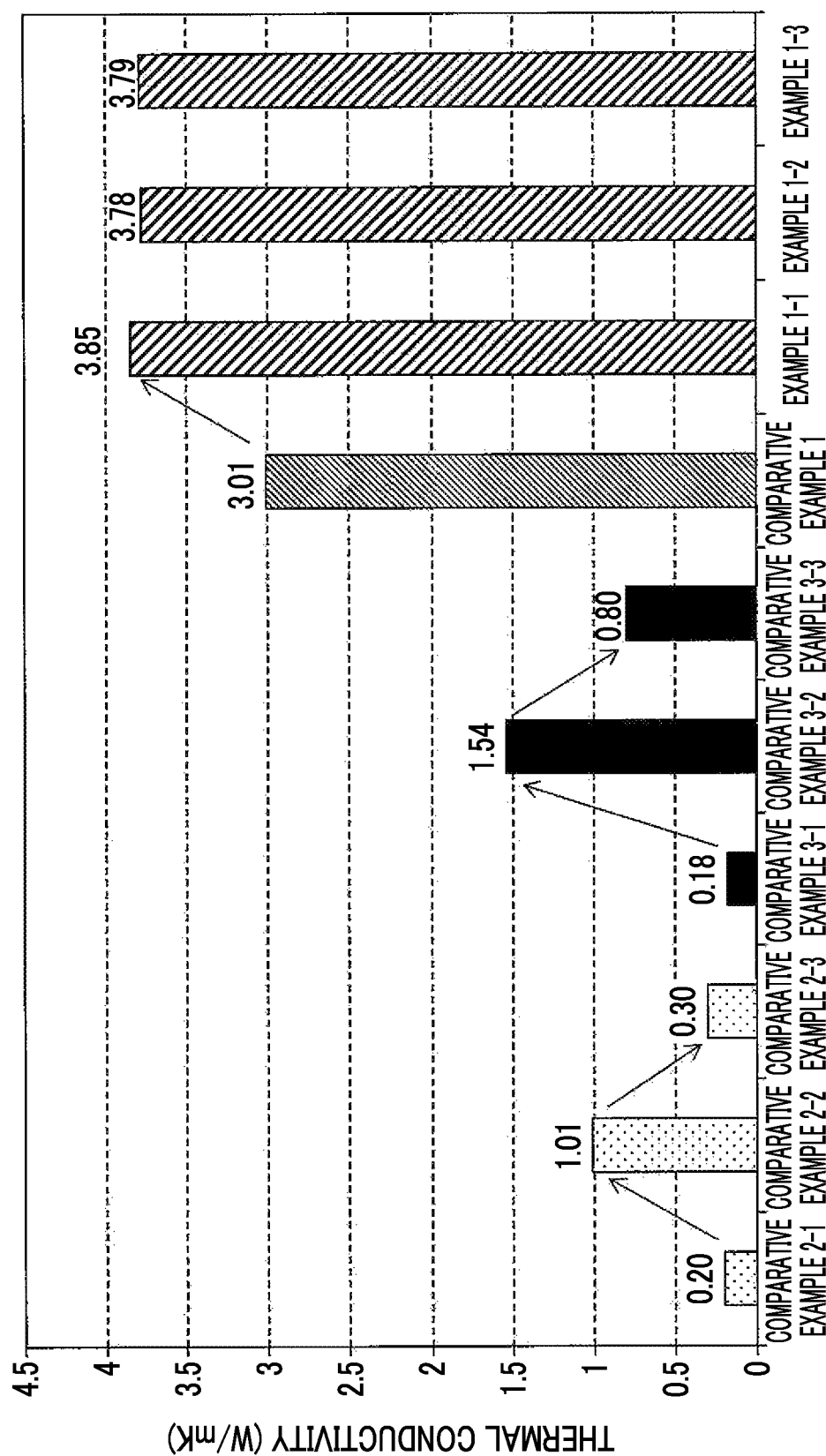
FIG. 2 is a graph showing measurement results of thermal conductivities of composite materials of Examples 1-1 to 1-3 and Comparative Examples 1 to 3-3 in a thickness direction.

Thermal conductivities of the composite materials of Examples 1-1 to 1-3 and Comparative Examples 1 to 3-3 in the thickness direction (direction orthogonal to the flowing direction of the resin) were measured. Specifically, first, the specific heat capacity C, the thermal diffusivity α, and the density ρ of the specimens were measured at room temperature, and the thermal conductivity was calculated by the following equation. The results are shown in Table 1 and FIG. 2.

$$\lambda = C \cdot \alpha \cdot \rho$$

(λ: thermal conductivity, C: specific heat capacity, α: thermal diffusivity, ρ: density)

Here, the specific heat capacity C, the thermal diffusivity α, and the density ρ of the specimens were measured as follows. First, at room temperature, the specimens were immersed, and the density ρ of the specimens was measured according to the Archimedes method. Next, samples of 25 mg to 40 mg were extracted from the specimens, and at room temperature, a differential scanning calorimeter (DSC200C commercially available from Seiko Instruments Inc.) was used to perform differential scanning calorimetry (DSC), and the specific heat capacity C of the samples was measured under an argon gas atmosphere.

Samples with a diameter of 1 mm and a thickness of 1 mm were cut out from the specimens and the thermal diffusivity α of the samples was measured in a vacuum using a thermal constant measuring device (TC-7000 commercially available from Advance Riko, Inc.) according to a laser flash method.

<Measurement of Volume Resistivity>

The volume resistivities of the composite materials of Examples 1-1 to 1-3 and Comparative Examples 1 to 3-3 were measured according to JISK6249. Specifically, specimens with a size of 80 mm×80 mm×2 mm were prepared by the same method as in Examples 1-1 to 1-3 and Comparative Examples 1 to 3-3, and the volume resistivities of the specimens were measured using an ultrahigh resistance/microammeter (R8340 commercially available from ADVANTEST). The results are shown in Table 1.

<Observation of Voids>

The specimen of Example 1-1 was cut in the thickness direction, and the inner wall of the voids was observed under a scanning electron microscope (SEM). The results are shown in FIG. 3A to FIG. 3C. FIG. 3A is a picture obtained by imaging an appearance of the void formed in the composite material. FIG. 3B is an enlarged picture of the inner wall of the void of a part A in FIG. 3A. FIG. 3C is an enlarged picture of the picture in FIG. 3B.

TABLE 1

| | Filler | | Resin | | Thermal | Volume |
| --- | --- | --- | --- | --- | --- | --- |
| | Type and amount | Shape | (binding resin) | Foaming magnification | conductivity (W/mK) | resistivity ($10^{13}$ Ω · cm) |
| Example 1-1 | Boron nitride (60 mass %) | Scaly (proportion of 50) | Polyester | 2.0 | 3.85 | 1.0 |
| Example 1-2 | Boron nitride (60 mass %) | Scaly (proportion of 120) | Polyester | 2.0 | 3.78 | 1.0 |
| Example 1-3 | Boron nitride (60 mass %) | Scaly (proportion of 450) | Polyester | 2.0 | 3.79 | 1.0 |
| Comparative Example 1 | Boron nitride (60 mass %) | Scaly (proportion of 50) | Polyester | 0.0 | 3.01 | 2.0 |
| Comparative Example 2-1 | None | | Polyester | 0.0 | 0.20 | 5.0 |

TABLE 1-continued

| | Filler | | Resin | | Thermal | Volume |
|---|---|---|---|---|---|---|
| | Type and amount | Shape | (binding resin) | Foaming magnification | conductivity (W/mK) | resistivity ($10^{13}$ Ω·cm) |
| Comparative Example 2-2 | Alumina (60 mass %) | Spherical | Polyester | 0.0 | 1.01 | 2.0 |
| Comparative Example 2-3 | Alumina (60 mass %) | Spherical | Polyester | 2.0 | 0.30 | 1.0 |
| Comparative Example 3-1 | None | | Silicone | 0.0 | 0.18 | 6.0 |
| Comparative Example 3-2 | Diamond (84 mass %) | Pulverized (amorphous) | Silicone | 0.0 | 1.54 | 5.0 |
| Comparative Example 3-3 | Diamond (84 mass %) | Pulverized (amorphous) | Silicone | 2.0 | 0.80 | 4.0 |

(Results 1)

The thermal conductivities of the composite materials of Examples 1-1 to 1-3 were higher than those of Comparative Examples 1 to 3-3. In addition, when the structure of Example 1-1 was observed under the SEM, the fillers had accumulated on the inner wall of the voids so that flat surfaces of the scaly fillers overlapped each other (refer to FIGS. 3A to 3C). Based on these results, it is thought that, in the composite materials of Examples 1-1 to 1-3, a skeleton of the inorganic material in which fillers accumulated on the inner wall of the spherical voids so that flat surfaces of scaly fillers overlapped was formed, and fillers were dispersed in other parts so that they came in contact with the skeleton. Therefore, it is thought that the thermal conduction path was also formed in the thickness direction of the composite material, and the thermal conductivities of the composite materials of Examples 1-1 to 1-3 were improved in all directions (isotropic).

On the other hand, when comparing Example 1-1 and Comparative Example 1, in the composite material of Comparative Example 1 in which the binding resin did not foam, it is thought that many fillers that were arranged in the flowing direction of the resin in the composite material were bonded by the binding resin (refer to FIG. 8). Therefore, it is thought that the thermal conductivity of the composite material of Comparative Example 1 in the thickness direction was lower than that of Example 1-1.

When comparing Comparative Examples 2-1 to 2-3, in the composite material of Comparative Example 2-2, since spherical alumina fillers were filled in (contained) in contrast to Comparative Example 2-1, the thermal conductivity of the composite material of Comparative Example 2-2 was higher than that of Comparative Example 2-1. However it is thought that, even if the binding resin was foamed as in Comparative Example 2-3, spherical fillers did not accumulate on the wall surface of the voids (empty spaces) of the composite material as in Example 1-1. Therefore, it is thought that, since the voids of the composite material were simply provided as an empty space, the thermal conductivity of the composite material of Comparative Example 2-3 in the thickness direction was lower than that of Comparative Example 2-2.

When comparing Comparative Examples 3-1 to 3-3, it is thought that, for the same reason as described when comparing Comparative Examples 2-1 to 2-3, fillers did not accumulate on the wall surface of the voids due to the shape of the diamond filler. Since the fillers of Comparative Example 3-2 and Comparative Example 3-3 were pulverized diamond fillers having an amorphous shape, the fillers in the composite material hardly came in contact with each other due to the shape. Therefore, it is thought that, while the thermal conductivity of diamond is higher than the thermal conductivity of hexagonal boron nitride, the thermal conductivities of the fillers of Comparative Example 3-2 and Comparative Example 3-3 were lower.

In addition, as shown in Table 1, it is thought that, in Examples 1-1 to 1-3, when the proportion of the average length of flat surfaces of the fillers was in a range of 50 to 450 with respect to the thickness of the filler, the fillers accumulated on the inner wall of the voids so that the flat surfaces of the scaly fillers overlapped each other, and the thermal conductivity of the composite material was easily improved. Here, all of the composite materials of Examples 1-1 to 1-3 and Comparative Examples 1 to 3-3 had a volume resistivity (resistivity) of $1.0 \times 10^{13}$ Ω·cm or more and could be used as insulating materials.

Examples 4-1 to 4-16

Specimens made of composite materials of Examples 4-1 to 4-16 were prepared in the same manner as in Example 1-1. In Examples 4-1 to 4-4, in the same procedures as in Example 1-1, a proportion of ethanol mixed in was adjusted, a mixture without ethanol was foamed to 1.1 times its original volume, and the filling amount of the fillers was set to be sequentially 20 mass %, 30 mass %, 50 mass %, and 60 mass %. Here, since the foaming magnification of the composite materials was 1.1, the occupancy proportion of the voids occupying the composite material with respect to the entire composite material of Examples 4-1 to 4-4 was 9 volume %.

In Examples 4-5 to 4-8, in the same procedures as in Example 1-1, a proportion of ethanol mixed in was adjusted, a mixture without ethanol was foamed to 1.3 times its original volume, and the filling amount of the fillers was set to be sequentially 20 mass %, 30 mass %, 50 mass %, and 60 mass %. Here, since the foaming magnification of the composite materials was 1.3, the occupancy proportion of the voids occupying the composite material with respect to the entire composite material of Examples 4-5 to 4-8 was 23 volume %.

In Examples 4-9 to 4-12, in the same procedures as in Example 1-1, a proportion of ethanol mixed in was adjusted, a mixture without ethanol was foamed to 1.5 times its original volume, and the filling amount of the fillers was set to be sequentially 20 mass %, 30 mass %, 50 mass %, and 60 mass %. Here, since the foaming magnification of the composite materials was 1.5, the occupancy proportion of the voids occupying the composite material with respect to the entire composite material of Examples 4-9 to 4-12 was 33 volume %.

In Examples 4-13 to 4-16, in the same procedures as in Example 1-1, a proportion of ethanol mixed in was adjusted, a mixture without ethanol was foamed to 2.0 times its original volume, and the filling amount of the fillers was set to be sequentially 20 mass %, 30 mass %, 50 mass %, and 60 mass %. Here, the specimen of Example 4-16 was the same as the specimen of Example 1-1. Since the foaming magnification of the composite materials was 2.0, the occupancy proportion of the voids occupying the composite materials with respect to the entire composite material of Examples 4-13 to 4-16 was 50 volume %.

Comparative Examples 4-1 to 4-4

In Comparative Examples 4-1 to 4-3, no ethanol was mixed in and no polyester resin was foamed (foaming magnification of 0), and the filling amount of the fillers was set to be sequentially 20 mass %, 30 mass %, 50 mass %, and 60 mass %. Here, the specimen of Comparative Example 4-4 was the same as the specimen of Comparative Example 1. Here, since the foaming magnification of the composite materials was 0.0, the occupancy proportion of the voids occupying the composite material with respect to the entire composite material of Comparative Examples 4-1 to 4-4 was 0 volume %.

The thermal conductivities of the composite materials of Examples 4-1 to 4-16 and Comparative Examples 4-1 to 4-4 were measured in the same method as in the method performed in Example 1-1. The results are shown in FIG. 4 and Table 2. The volume resistivities of the composite materials of Examples 4-1 to 4-16 and Comparative Examples 4-1 to 4-4 were measured in the same method as in the method performed in Example 1-1. The results are shown in Table 2.

TABLE 2

| | Filler | | Resin (binding resin) | Foaming magnification | Occupancy proportion of voids (volume %) | Thermal conductivity (W/mK) | Volume resistivity ($10^{13}$ Ω · cm) |
|---|---|---|---|---|---|---|---|
| | Type | Filling amount (mass %) | | | | | |
| Example 4-1 | Boron nitride | 20 | Polyester | 1.1 | 9 | 1.15 | 2.0 |
| Example 4-2 | Boron nitride | 30 | Polyester | 1.1 | 9 | 1.43 | 2.0 |
| Example 4-3 | Boron nitride | 50 | Polyester | 1.1 | 9 | 2.41 | 2.0 |
| Example 4-4 | Boron nitride | 60 | Polyester | 1.1 | 9 | 3.33 | 2.0 |
| Example 4-5 | Boron nitride | 20 | Polyester | 1.3 | 23 | 1.24 | 2.0 |
| Example 4-6 | Boron nitride | 30 | Polyester | 1.3 | 23 | 1.64 | 2.0 |
| Example 4-7 | Boron nitride | 50 | Polyester | 1.3 | 23 | 2.64 | 2.0 |
| Example 4-8 | Boron nitride | 60 | Polyester | 1.3 | 23 | 3.56 | 2.0 |
| Example 4-9 | Boron nitride | 20 | Polyester | 1.5 | 33 | 1.56 | 1.0 |
| Example 4-10 | Boron nitride | 30 | Polyester | 1.5 | 33 | 1.66 | 1.0 |
| Example 4-11 | Boron nitride | 50 | Polyester | 1.5 | 33 | 2.74 | 1.0 |
| Example 4-12 | Boron nitride | 60 | Polyester | 1.5 | 33 | 3.66 | 1.0 |
| Example 4-13 | Boron nitride | 20 | Polyester | 2.0 | 50 | 1.68 | 1.0 |
| Example 4-14 | Boron nitride | 30 | Polyester | 2.0 | 50 | 1.97 | 1.0 |
| Example 4-15 | Boron nitride | 50 | Polyester | 2.0 | 50 | 2.60 | 1.0 |
| Example 4-16 | Boron nitride | 60 | Polyester | 2.0 | 50 | 3.85 | 1.0 |
| Comparative Example 4-1 | Boron nitride | 20 | Polyester | None | 0 | 1.10 | 3.0 |
| Comparative Example 4-2 | Boron nitride | 30 | Polyester | None | 0 | 1.40 | 2.0 |
| Comparative Example 4-3 | Boron nitride | 50 | Polyester | None | 0 | 2.11 | 2.0 |
| Comparative Example 4-4 | Boron nitride | 60 | Polyester | None | 0 | 3.01 | 2.0 |

(Results 2)

As can be clearly understood from FIG. 4 and Table 2, in the composite materials with the same foaming magnification, the thermal conductivity of the composite materials improved as the filling amount of the fillers increased. Moreover, in the composite materials having the same filling amount of the fillers, the thermal conductivity of the composite material tended to increase as the foaming magnification increased. As described above, this is thought to have been caused by the fact that the number of voids with an inner wall on which fillers accumulated increased in the composite material as the foaming magnification of the composite materials increased. Here, all of the composite materials of Examples 4-1 to 4-16 and Comparative Examples 4-1 to 4-4 had a volume resistivity (resistivity) of $1.0 \times 10^{13}$ Ω·cm or more and could be used as insulating materials.

Comparative Examples 5-1 to 5-20

As a confirmatory test, the same spherical alumina fillers and polyester resin as in Comparative Examples 2-1 to 2-3 were used to prepare specimens of Comparative Examples 5-1 to 5-20. In Comparative Examples 5-1 to 5-4, no ethanol was mixed in, the polyester resin was non-foamed (a foaming magnification of 0.0 and a void occupancy proportion of 0 volume %), and the filling amount of the fillers was set to be sequentially 60 mass %, 70 mass %, 80 mass %, and 90 mass %.

In Comparative Examples 5-5 to 5-8, in the same procedures as in Comparative Example 2-3, a proportion of ethanol mixed in was adjusted, a mixture without ethanol was foamed to 1.1 times its original volume (void occupancy proportion of 9 volume %), and the filling amount of the fillers was set to be sequentially 60 mass %, 70 mass %, 80 mass %, and 90 mass %.

In Comparative Examples 5-9 to 5-12, in the same procedures as in Comparative Example 2-3, a proportion of ethanol mixed in was adjusted, a mixture without ethanol was foamed to 1.3 times its original volume (void occupancy proportion of 23 volume %), and the filling amount of the fillers was set to be sequentially 60 mass %, 70 mass %, 80 mass %, and 90 mass %.

In Comparative Examples 5-13 to 5-16, in the same procedures as in Comparative Example 2-3, a proportion of ethanol mixed in was adjusted, a mixture without ethanol was foamed to 1.5 times its original volume (void occupancy proportion of 33 volume %), and the filling amount of the fillers was set to be sequentially 60 mass %, 70 mass %, 80 mass %, and 90 mass %.

In Comparative Examples 5-17 to 5-20, in the same procedures as in Comparative Example 2-3, a proportion of ethanol mixed in was adjusted, a mixture without ethanol was foamed to 2.0 times its original volume (void occupancy proportion of 50 volume %), and the filling amount of the fillers was set to be sequentially 60 mass %, 70 mass %, 80 mass %, and 90 mass %.

Figure 5:
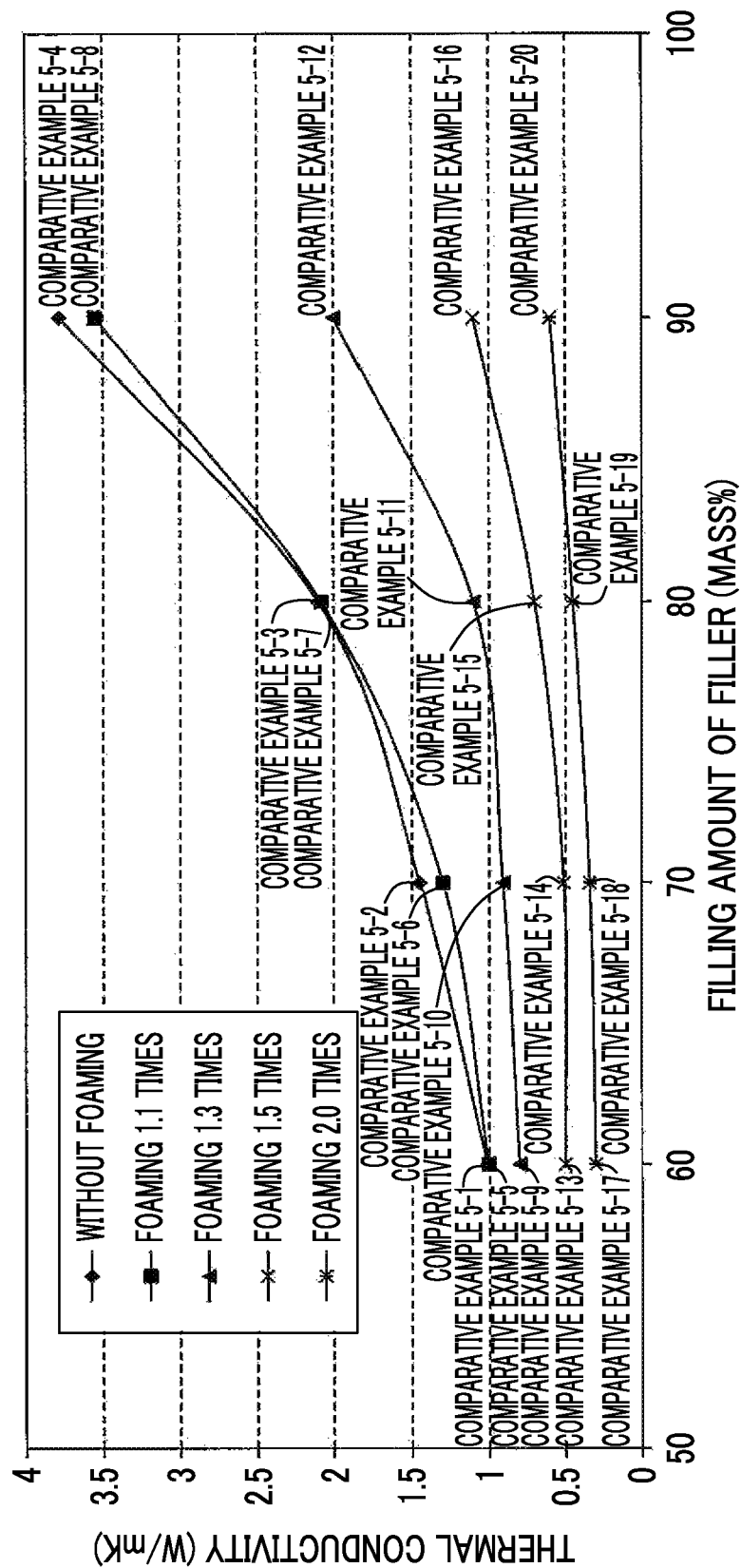
FIG. 5 is a graph showing measurement results of thermal conductivities of composite materials of Comparative Examples 5-1 to 5-20 in the thickness direction.

The thermal conductivities of the composite materials of Comparative Examples 5-1 to 5-20 were measured in the same method as in the method performed in Example 1-1. The results are shown in FIG. 5 and Table 3. The volume resistivities of the composite materials of Comparative Examples 5-1 to 5-20 were measured in the same method as in the method performed in Example 1-1. The results are shown in Table 3.

TABLE 3

| | Filler | | | | Occupancy | | |
| --- | --- | --- | --- | --- | --- | --- | --- |
| | Type | Filling amount (mass %) | Resin (binding resin) | Foaming magnification | proportion of voids (volume %) | Thermal conductivity (W/mK) | Volume resistivity ($10^{13}$ Ω·cm) |
| Comparative Example 5-1 | Alumina | 60 | Polyester | 0.0 | 0 | 1.01 | 2.0 |
| Comparative Example 5-2 | Alumina | 70 | Polyester | 0.0 | 0 | 1.45 | 2.0 |
| Comparative Example 5-3 | Alumina | 80 | Polyester | 0.0 | 0 | 2.10 | 2.0 |
| Comparative Example 5-4 | Alumina | 90 | Polyester | 0.0 | 0 | 3.78 | 1.0 |
| Comparative Example 5-5 | Alumina | 60 | Polyester | 1.1 | 9 | 1.00 | 2.0 |
| Comparative Example 5-6 | Alumina | 70 | Polyester | 1.1 | 9 | 1.30 | 5.0 |
| Comparative Example 5-7 | Alumina | 80 | Polyester | 1.1 | 9 | 2.08 | 2.0 |
| Comparative Example 5-8 | Alumina | 90 | Polyester | 1.1 | 9 | 3.55 | 2.0 |
| Comparative Example 5-9 | Alumina | 60 | Polyester | 1.3 | 23 | 0.80 | 2.0 |
| Comparative Example 5-10 | Alumina | 70 | Polyester | 1.3 | 23 | 0.91 | 2.0 |
| Comparative Example 5-11 | Alumina | 80 | Polyester | 1.3 | 23 | 1.10 | 2.0 |
| Comparative Example 5-12 | Alumina | 90 | Polyester | 1.3 | 23 | 2.00 | 2.0 |
| Comparative Example 5-13 | Alumina | 60 | Polyester | 1.5 | 33 | 0.50 | 1.0 |
| Comparative Example 5-14 | Alumina | 70 | Polyester | 1.5 | 33 | 0.51 | 1.0 |
| Comparative Example 5-15 | Alumina | 80 | Polyester | 1.5 | 33 | 0.70 | 1.0 |
| Comparative Example 5-16 | Alumina | 90 | Polyester | 1.5 | 33 | 1.10 | 1.0 |
| Comparative Example 5-17 | Alumina | 60 | Polyester | 2.0 | 50 | 0.30 | 1.0 |
| Comparative Example 5-18 | Alumina | 70 | Polyester | 2.0 | 50 | 0.34 | 2.0 |
| Comparative Example 5-19 | Alumina | 80 | Polyester | 2.0 | 50 | 0.45 | 1.0 |
| Comparative Example 5-20 | Alumina | 90 | Polyester | 2.0 | 50 | 0.60 | 2.0 |

(Results 3)

As can be clearly understood from FIG. 5 and Table 3, even if the spherical alumina fillers were used, in the composite materials with the same foaming magnification, the thermal conductivities of the composite materials improved as the filling amount of the fillers increased.

However, in the composite materials having the same filling amount of the fillers, the thermal conductivities of the composite materials decreased as the foaming magnification increased. This is thought to have been caused by the fact that, even if the binding resin was foamed, the spherical fillers did not accumulate on the inner wall of the voids in an overlapping manner, a skeleton of the inorganic material was not formed in the voids of the composite material, and the voids were simply provided as empty spaces. As a result, it is thought that there were more such voids as the foaming magnification increased, and the thermal conductivity of the composite material decreased.

Comparative Examples 6-1 to 6-15

As a confirmatory test, the same pulverized diamond fillers and silicone resin as in Comparative Examples 3-1 to 3-3 were used to prepare specimens of Comparative Examples 6-1 to 6-15. In Comparative Examples 6-1 to 6-3, no ethanol was mixed in, the polyester resin was non-foamed (a foaming magnification of 0.0 and a void occupancy proportion of 0 volume %), and the filling amount of the fillers was set to be sequentially 70 mass %, 80 mass %, and 84 mass %.

In Comparative Examples 6-4 to 6-6, in the same procedures as in Comparative Example 3-3, a proportion of ethanol mixed in was adjusted, and a mixture without ethanol was foamed to 1.1 times its original volume (a void occupancy proportion of 9 volume %), and the filling amount of the fillers was set to be sequentially 70 mass %, 80 mass %, and 84 mass %.

In Comparative Examples 6-7 to 6-9, in the same procedures as in Comparative Example 3-3, a proportion of ethanol mixed in was adjusted, and a mixture without ethanol was foamed to 1.3 times its original volume (a void occupancy proportion of 23 volume %), and the filling amount of the fillers was set to be sequentially 70 mass %, 80 mass %, and 84 mass %.

In Comparative Examples 6-10 to 6-12, in the same procedures as in Comparative Example 3-3, a proportion of ethanol mixed in was adjusted, a mixture without ethanol was foamed to 1.5 times its original volume (a void occupancy proportion of 33 volume %), and the filling amount of the fillers was set to be sequentially 70 mass %, 80 mass %, and 84 mass %.

In Comparative Examples 6-13 to 6-15, in the same procedures as in Comparative Example 3-3, a proportion of ethanol mixed in was adjusted, a mixture without ethanol was foamed to 2.0 times its original volume (a void occupancy proportion of 50 volume %), and the filling amount of the fillers was set to be sequentially 70 mass %, 80 mass %, and 84 mass %.

Figure 6:
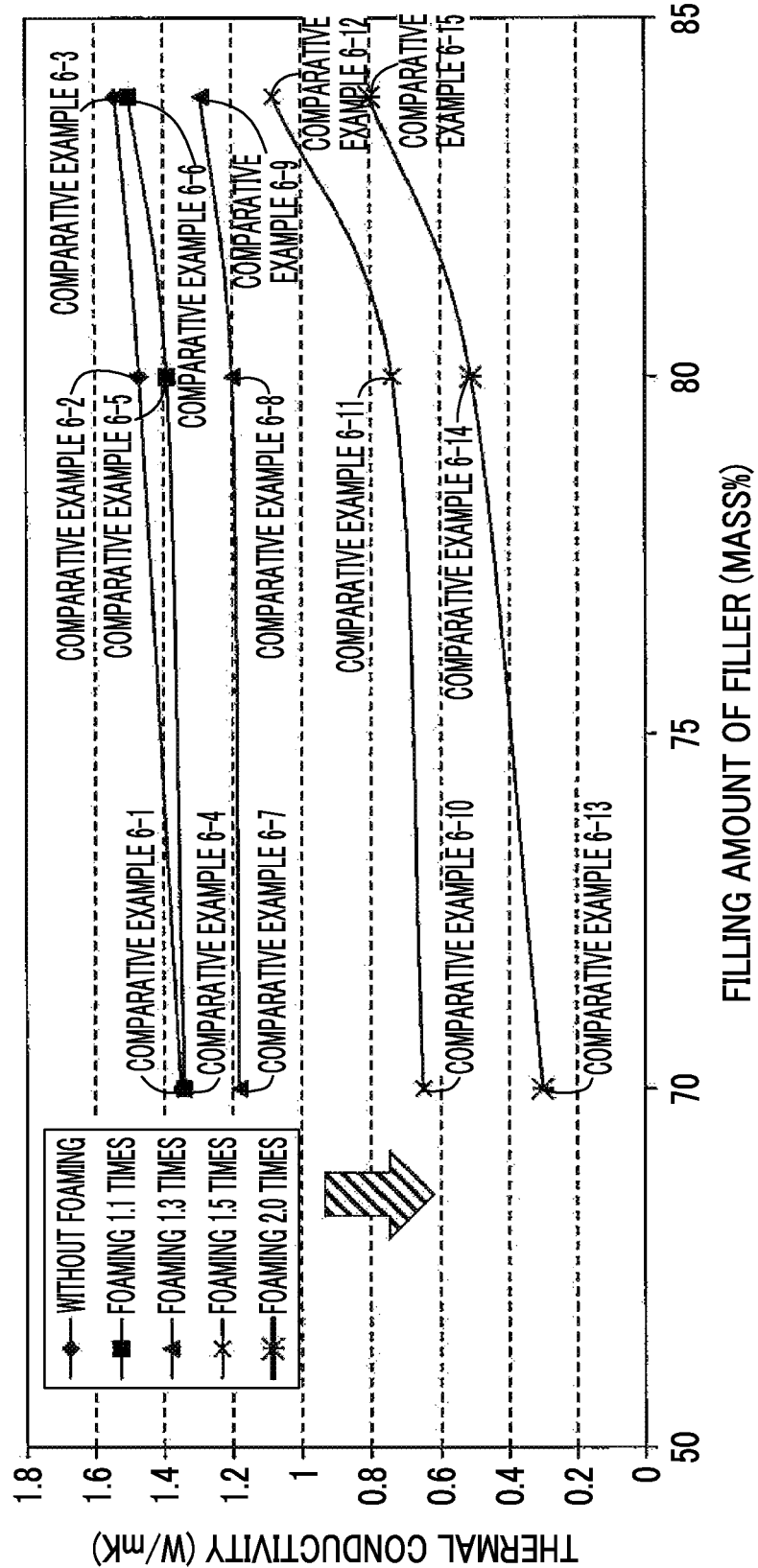
FIG. 6 is a graph showing measurement results of thermal conductivities of composite materials of Comparative Examples 6-1 to 6-15 in the thickness direction.

The thermal conductivities of the composite materials of Comparative Examples 6-1 to 6-15 were measured in the same method as in the method performed in Example 1-1. The results are shown in FIG. 6 and Table 4. The volume resistivities of the composite materials of Comparative Examples 6-1 to 6-15 were measured in the same method as in the method performed in Example 1-1. The results are shown in Table 4.

TABLE 4

| | Filler | | | | Occupancy | | |
|---|---|---|---|---|---|---|---|
| | Type | Filling amount (mass %) | Resin (binding resin) | Foaming magnification | proportion of voids (volume %) | Thermal conductivity (W/mK) | Volume resistivity ($10^{13}$ Ω · cm) |
| Comparative Example 6-1 | Diamond | 70 | Silicone | 0.0 | 0 | 1.35 | 5.0 |
| Comparative Example 6-2 | Diamond | 80 | Silicone | 0.0 | 0 | 1.47 | 5.0 |
| Comparative Example 6-3 | Diamond | 84 | Silicone | 0.0 | 0 | 1.54 | 5.0 |
| Comparative Example 6-4 | Diamond | 70 | Silicone | 1.1 | 9 | 1.34 | 4.0 |
| Comparative Example 6-5 | Diamond | 80 | Silicone | 1.1 | 9 | 1.39 | 4.0 |
| Comparative Example 6-6 | Diamond | 84 | Silicone | 1.1 | 9 | 1.50 | 5.0 |
| Comparative Example 6-7 | Diamond | 70 | Silicone | 1.3 | 23 | 1.18 | 4.0 |
| Comparative Example 6-8 | Diamond | 80 | Silicone | 1.3 | 23 | 1.20 | 4.0 |
| Comparative Example 6-9 | Diamond | 84 | Silicone | 1.3 | 23 | 1.29 | 4.0 |
| Comparative Example 6-10 | Diamond | 70 | Silicone | 1.5 | 33 | 0.65 | 6.0 |
| Comparative Example 6-11 | Diamond | 80 | Silicone | 1.5 | 33 | 0.74 | 4.0 |
| Comparative Example 6-12 | Diamond | 84 | Silicone | 1.5 | 33 | 1.08 | 4.0 |
| Comparative Example 6-13 | Diamond | 70 | Silicone | 2.0 | 50 | 0.30 | 4.0 |
| Comparative Example 6-14 | Diamond | 80 | Silicone | 2.0 | 50 | 0.51 | 3.0 |
| Comparative Example 6-15 | Diamond | 84 | Silicone | 2.0 | 50 | 0.80 | 4.0 |

(Results 4)

As can be clearly understood from FIG. 6, even if the pulverized diamond fillers were used, in the composite materials with the same foaming magnification, the thermal conductivity of the composite materials improved as the filling amount of the fillers increased.

However, in the composite materials having the same filling amount of the fillers, the thermal conductivity of the composite materials decreased as the foaming magnification increased. This is thought to have been caused by the fact that, even if the binding resin was foamed, like the spherical alumina fillers, the pulverized diamond fillers did not accumulate on the inner wall of the voids in an overlapping manner, a skeleton of the inorganic material was not formed in the voids of the composite material, and the voids were simply provided as an empty space. As a result, it is thought that there were more such voids as the foaming magnification increased, and the thermal conductivity of the composite material decreased.

Reference Examples 7-1 to 7-9

As a confirmatory test, carbon fiber fillers (K2223HM commercially available from Mitsubishi Plastics, Inc.) with a diameter of 11 mm and a length of 50 μm and the same polyester resin as in Example 1-1 were used to prepare specimens of Reference Examples 7-1 to 7-9. In Reference Examples 7-1 to 7-3, no ethanol was mixed in, the polyester resin was non-foamed, and the filling amount of the fillers was set to be sequentially 3 mass %, 10 mass %, and 20 mass %.

In Reference Examples 7-4 to 7-6, in the same procedures as in Example 1-1, a proportion of ethanol mixed in was adjusted, a mixture without ethanol was foamed to 1.1 times its original volume, and the filling amount of the fillers was set to be sequentially 3 mass %, 10 mass %, and 20 mass %.

In Reference Examples 7-7 to 7-9, in the same procedures as in Example 1-1, a proportion of ethanol mixed in was adjusted, a mixture without ethanol was foamed to 1.5 times its original volume, and the filling amount of the fillers was set to be sequentially 3 mass %, 10 mass %, and 20 mass %.

The thermal conductivities of the composite materials of Reference Examples 7-7 to 7-9 were measured in the same method as in the method performed in Example 1-1. The results are shown in FIG. 7 and Table 5. The volume resistivities of the composite materials of Reference Examples 7-1 to 7-9 were measured in the same method as in the method performed in Example 1-1. The results are shown in Table 5. Here, Table 5 shows the thermal conductivity of the composite material of Example 1-1 and the thermal conductivity of the polyester resin of Comparative Example 2-1 in combination, and also shows the volume resistivity of the composite material of Example 1-1 and the volume resistivity of the polyester resin of Comparative Example 2-1 in combination.

TABLE 5

| | Filler | | | | Occupancy | | |
| --- | --- | --- | --- | --- | --- | --- | --- |
| | Type and amount | Filling amount (mass %) | Resin (binding resin) | Foaming magnification | proportion of voids (volume %) | Thermal conductivity (W/mK) | Volume resistivity ($10^{13}$ Ω·cm) |
| Reference Example 7-1 | Carbon fibers | 3 | Polyester | 0.0 | 0 | 0.97 | <0.001 |
| Reference Example 7-2 | Carbon fibers | 10 | Polyester | 0.0 | 0 | 2.04 | <0.001 |
| Reference Example 7-3 | Carbon fibers | 20 | Polyester | 0.0 | 0 | 2.76 | <0.001 |
| Reference Example 7-4 | Carbon fibers | 3 | Polyester | 1.1 | 9 | 3.01 | <0.001 |
| Reference Example 7-5 | Carbon fibers | 10 | Polyester | 1.1 | 9 | 2.10 | <0.001 |
| Reference Example 7-6 | Carbon fibers | 20 | Polyester | 1.1 | 9 | 2.70 | <0.001 |
| Reference Example 7-7 | Carbon fibers | 3 | Polyester | 1.5 | 33 | 1.10 | <0.001 |
| Reference Example 7-8 | Carbon fibers | 10 | Polyester | 1.5 | 33 | 2.50 | <0.001 |
| Reference Example 7-9 | Carbon fibers | 20 | Polyester | 1.5 | 33 | 2.80 | <0.001 |
| Example 1-1 | Boron nitride | 60 | Polyester | 2.0 | 50 | 3.85 | 1.0 |
| Comparative Example 2-1 | None | | Polyester | None | 0 | 0.20 | 5.0 |

(Results 5)

As can be clearly understood from FIG. 7 and Table 5, in the composite materials with the same foaming magnification, the thermal conductivity of the composite materials improved as the filling amount of the fillers increased. Moreover, in the composite materials having the same filling amount of the fillers, the thermal conductivity of the composite materials improved as the foaming magnification increased. This is thought to have been to be caused by the fact that, since the fillers had a fiber form, the fibers arranged in the flowing direction of the binding resin due to foaming were arranged in the thickness direction at random due to the presence of the voids. However, as shown in Table 5, in the composite materials according to Reference Examples 7-1 to 7-9, since the fillers were carbon fibers, the volume resistivity decreased and the materials were not suitable as insulating materials.

While embodiments of the present disclosure have been described above, specific configurations are not limited to those of the embodiments and examples, and design modifications within the scope without departing from the scope of the present disclosure are included in the present disclosure.

What is claimed is:

1. A composite material comprising:
   scaly fillers made of a thermally conductive inorganic material; and
   a binding resin that is a thermosetting resin which binds the fillers,
   wherein the composite material is a foaming material in which a plurality of voids are dispersed therein,
   wherein the fillers accumulate on inner walls of the voids so that flat surfaces of the fillers overlap each other,
   wherein the scaly fillers have a higher thermal conductivity than that of the thermosetting resin,
   wherein a proportion of an average length of flat surfaces of the fillers with respect to a thickness of the fillers is in a range of 50 to 500, and
   a content of the scaly fillers is 20 mass % to 60 mass % with respect to the entire composite material.

2. The composite material according to claim 1, wherein the voids are independent bubbles and a diameter of the voids is 1 μm or more and 500 μm or less.

3. The composite material according to claim 1, wherein an occupancy proportion of the voids occupying the composite material is 9 volume % or more and 50 volume % or less with respect to the entire composite material.

4. The composite material according to claim 1, wherein the scaly fillers are selected from the group consisting of hexagonal boron nitride, mica, or silica.

5. The composite material according to claim 1, wherein the scaly fillers have a thermal conductivity of 1.0 W/mK or more.

6. The composite material according to claim 1, wherein the thermosetting resin is a polyester resin.

7. The composite material according to claim 1, wherein the composite material consists of the scaly fillers and binding resin.

8. The composite material according to claim 1, wherein the voids contain only the scaly fillers.

9. The composite material according to claim 1, wherein the voids consist of the scaly fillers.

10. A method of producing a composite material according to claim 1, the method comprising:
    preparing a mixture by mixing the fillers, the binding resin that is an uncured thermosetting resin, and a foaming agent that causes the binding resin to foam at a temperature lower than a curing temperature of the thermosetting resin; and
    heating the mixture to the curing temperature or higher such that i) the binding resin is foamed with the foaming agent so that the fillers accumulate on inner walls of voids in the binding resin formed by the foaming agent and flat surfaces of the fillers overlap each other, and ii) then the binding resin is cured.

11. The method of producing a composite material according to claim 10, wherein the voids are independent bubbles and the binding resin is cured so that a diameter of the voids becomes 500 μm or less.

12. The method of producing a composite material according to claim 10, wherein the foaming agent is mixed with the fillers and the binding resin so that an occupancy proportion of the voids occupying the composite material is 9 volume % or more with respect to the entire composite material.

* * * * *